E. KREBS.
GARDEN AND LAWN RAKE.
APPLICATION FILED NOV. 26, 1917.
1,262,811.
Patented Apr. 16, 1918.
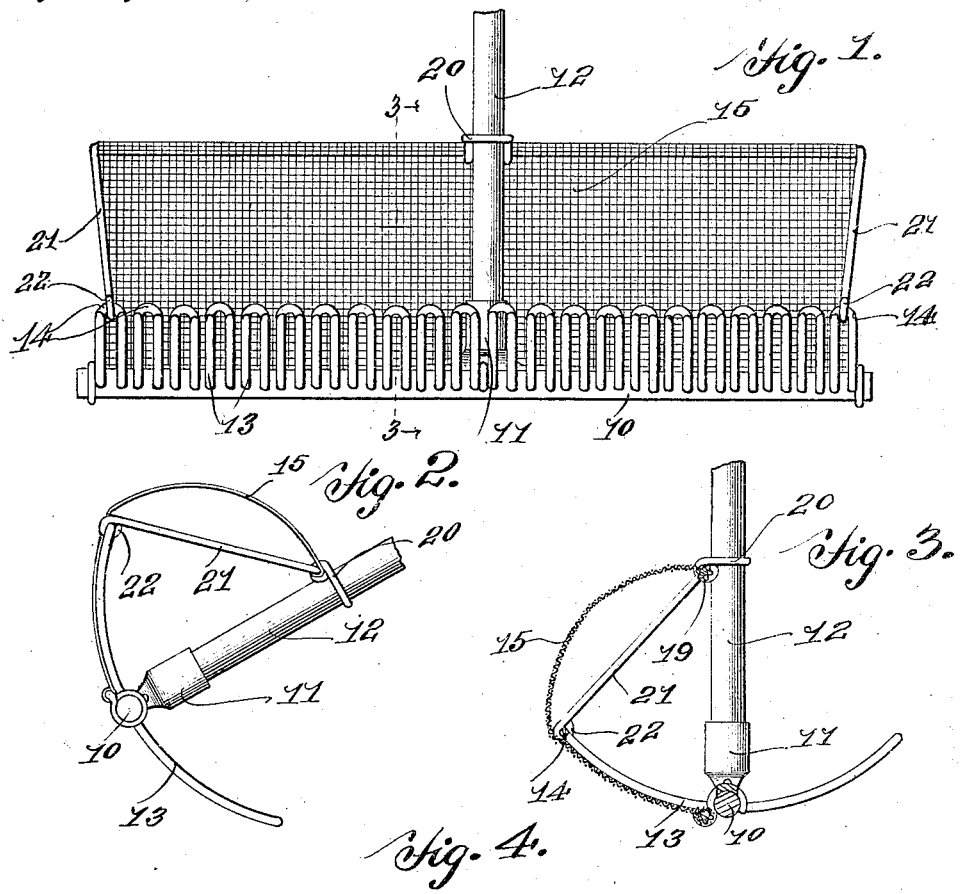
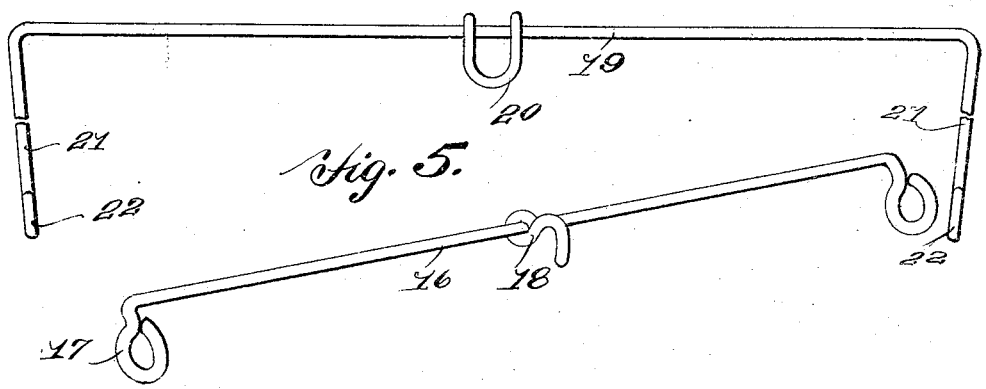
Witnesses
Inventor
E. Krebs
By Chandler Chandler
Attorney

UNITED STATES PATENT OFFICE.

EARL KREBS, OF DAVENPORT, IOWA.

GARDEN AND LAWN RAKE.

1,262,811.

Specification of Letters Patent.

Patented Apr. 16, 1918.

Application filed November 26, 1917. Serial No. 204,044.

*To all whom it may concern:*

Be it known that I, EARL KREBS, a citizen of the United States, residing at Davenport, in the county of Scott, State of Iowa, have invented certain new and useful Improvements in Garden and Lawn Rakes; and I do hereby declare the following to be a full, clear, and exact description of the invention, such as will enable others skilled in the art to which it appertains to make and use the same.

This invention is an improvement in garden and lawn rakes and has particular reference to a gathering or bunching attachment therefor.

An object of the invention is to facilitate the gathering or bunching of leaves or other material and preventing the same from falling over the top of the rake teeth during the raking operation and, to this end, use is preferably made of a guard formed of wire mesh and supported by the rake head and teeth through the medium of frames or bracing elements attached thereto.

Another object is the provision of a guard of simple and inexpensive construction which may be readily and quickly attached to and detached from the rake and which will be effective in carrying out the purpose for which it is designed.

The inventive idea involved is capable of receiving a variety of mechanical expressions one of which, for the purpose of illustrating the invention, is shown in the accompanying drawing, wherein:—

Figure 1 is a rear elevation of a rake showing the attachment applied thereto and constructed in accordance with the invention.

Fig. 2 is a side elevation thereof.

Fig. 3 is a section on the line 3—3 of Fig. 1.

Fig. 4 is a detail view of one of the guard supporting frames.

Fig. 5 is a similar view of the other supporting frame.

The invention is preferably used in connection with a rake having an elongated head 10 provided intermediate its ends with a socket member 11 in which is mounted one end of the handle 12, said head having a plurality of teeth 13 mounted therein each of which is formed from a single length of wire or rod bent upon itself intermediate its ends as indicated at 14.

The attachment which comprises the essential feature of the invention is preferably formed of a wire mesh body portion 15 of a length substantially equal to the width of the rake and bent transversely into substantially semicircular formation. When the body is in its operative position and the extremities of the teeth 13 are being employed to gather leaves and other material on a lawn or in a garden, the intermediate portion of the body will overhang the upper bent portions 14 of the teeth 13 and partially inclose the same and the lower edge of the body will be disposed adjacent the rake head 10. In order to secure the body in this position, the lower edge of the same has secured thereto a frame consisting of an elongated rod 16 which will lend rigidity to the body and which is provided upon each end with a hook or bent portion 17 which engages the adjacent end of the rake head. The intermediate portion of the rod 16 also is provided with an adjustable hook 18 which preferably engages the socket 11 of the rake head so that the lower portion of the body will be connected thereto. The upper longitudinal edge of the body 15 is likewise secured to the intermediate portion of a frame or supporting rod 19 provided intermediate its end with an adjustable hook 20 for embracing the lower end of the handle 12 and the ends 21 of said rod 19 are bent at substantially right angles to the intermediate portion and provided upon their extremities with the hooks 22. These hooks 22 are adapted to be connected to and disconnected from the intermediate bent portions 14 of the teeth 13 and in this manner the body 15 will be retained in its proper position so that any leaves gathered by the teeth 13 which may fall over the top thereof will be caught and bunched by the body 15 and thus be prevented from scattering.

What is claimed is:—

The combination with a rake, of an attachment therefor including a body portion of substantially semicircular formation in cross section, a rod secured along one longitudinal edge of the body and provided at its ends with hooks for engagement with the rake head, and a second rod having its intermediate portion secured to the opposite longitudinal edge of the body and connected to the handle of the rake, the ends of said second rod being bent and having terminal hoods for connection with the end teeth of the rake.

In testimony whereof, I affix my signature in the presence of two witnesses.

EARL KREBS.

Witnesses:
HARRY O. HANSEN,
ED H. BEIN.

Copies of this patent may be obtained for five cents each, by addressing the "Commissioner of Patents, Washington, D. C."